US006630923B2

(12) United States Patent
Sato (10) Patent No.: US 6,630,923 B2
(45) Date of Patent: Oct. 7, 2003

(54) THREE-DIMENSIONAL INPUT APPARATUS (75) Inventor: Makoto Sato, Machida (JP)

(73) Assignee: The Circle for the Promotion of Science and Engineering, Tokyo (JP)

(*) Notice: Subject to any disclaimer, the term of this patent is extended or adjusted under 35 U.S.C. 154(b) by 119 days.

(21) Appl. No.: 09/819,001

(22) Filed: Mar. 28, 2001

(65) Prior Publication Data
US 2001/0038376 A1 Nov. 8, 2001

(30) Foreign Application Priority Data

Mar. 30, 2000 (JP) ........................................ 2000-093904

(51) Int. Cl.[7] .................................................. G09G 5/00
(52) U.S. Cl. ........................ 345/156; 345/157; 345/162; 345/184; 345/701; 345/702; 463/30; 463/35; 463/43; 600/595
(58) Field of Search ................................ 345/156, 157, 345/162–184, 701, 702; 463/30–35, 43; 600/595

(56) References Cited

U.S. PATENT DOCUMENTS 5,143,505 A * 9/1992 Burdea et al. .............. 244/234
5,577,981 A * 11/1996 Jarvik ........................ 434/247
5,589,828 A * 12/1996 Armstrong ................. 200/6 A
6,246,390 B1 * 6/2001 Rosenberg .................. 345/156
6,366,273 B1 * 4/2002 Rosenberg et al. ......... 345/156

FOREIGN PATENT DOCUMENTS

| JP | A 64-76311 | 3/1989 |
| JP | 418626 | 1/1992 |
| JP | A 5-333994 | 12/1993 |
| JP | A 7-141099 | 6/1995 |
| JP | A 8-320761 | 12/1996 |

OTHER PUBLICATIONS

English Translation of JP 4018626A2, Three–Dimensional Input Device (Only Abstract in English).

* cited by examiner

Primary Examiner—Richard Hjerpe
Assistant Examiner—Henry N. Tran
(74) Attorney, Agent, or Firm—Liniak, Berenato & White

(57) ABSTRACT

A three-dimensional input apparatus provides the operation with at least six degrees of freedom. The apparatus comprises a grip for instructing the three-dimensional position, supporting points arranged at least seven locations surrounding the grip, strings connected between the grip and the supporting point, rotary encoders for measuring the length of the strings, and the string tension controlling means for controlling the tension of the string on the basis of the measured result of the rotary encoders. In the apparatus, at least seven supporting points and at least seven strings are used, which gives the six degrees of freedom.

10 Claims, 11 Drawing Sheets

THREE-DIMENSIONAL INPUT APPARATUS

BACKGROUND OF THE INVENTION

1. Field of the Invention

The present invention relates to a three-dimensional input apparatus for operating a real or virtual object in a three-dimensional space, and more particularly relates to a three-dimensional input apparatus utilizing means of providing the tactile sense to an operator when the operator inputs the instruction.

2. Prior Art

As one of conventional three-dimensional input apparatus, there has been known an apparatus disclosed in Japanese Laid-open No. 4-18626.

Figure 1:
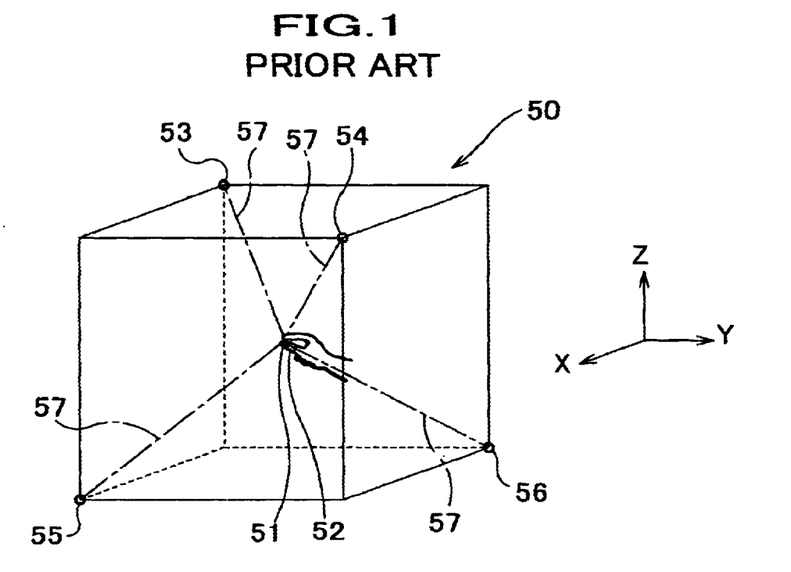
FIG. 1 is a perspective view showing a conventional three-dimensional input apparatus.

FIG. 1 shows a three-dimensional input apparatus 50 which measures the position of a fingertip in three degrees of freedom and which concurrently feeds back the force to the fingertip. The position of the finger 51 is measured by putting strings 57 from a ring 52 worn on the finger 51 to each of four fulcrums 53, 54, 55, 56 and detecting the length of the strings 57.

Figure 2:
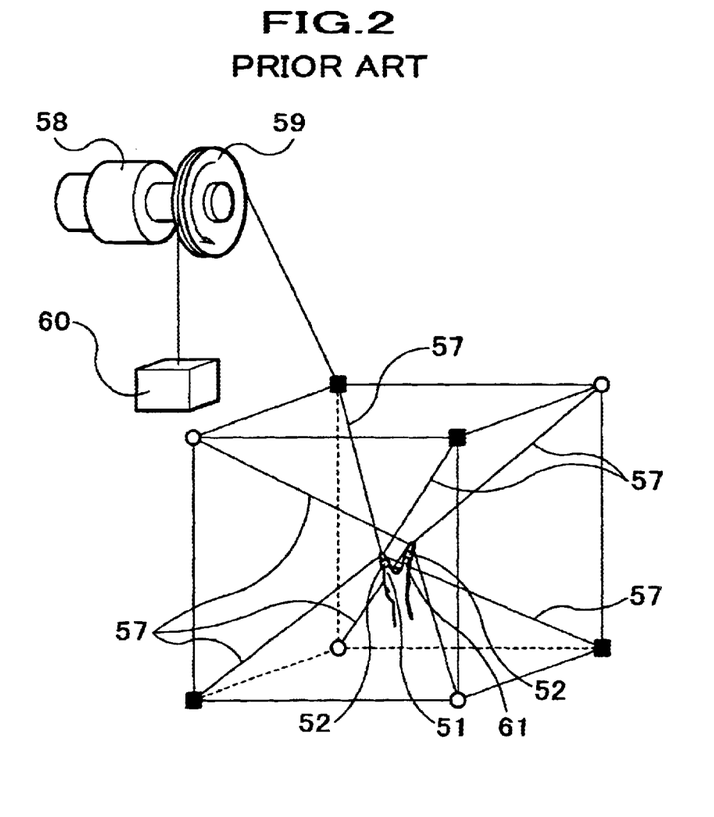
FIG. 2 is a perspective view showing another conventional three-dimensional input apparatus.

Further, as shown in FIG. 2, the feedback of the tactile sense to the fingertip is achieved by winding an end of each string 57 around a pulley 59 rotating together with a rotary encoder 58, attaching a weight 60 at the end of the string 57 to set the tension of the string 57 and controlling the strings 57 by an electromagnetic solenoid (not shown).

SUMMARY OF THE INVENTION

The conventional three-dimensional input apparatus detects the position of the fingertip in three degrees of freedom from the change in the length of the strings, controls the tension of the strings 57 on the basis of the properties of the virtual object, the position of the fingertip and others and feeds back the tactile sense (force) to the fingertip. However, it cannot rotate in the direction that the ring 52 moves.

Figure 3:
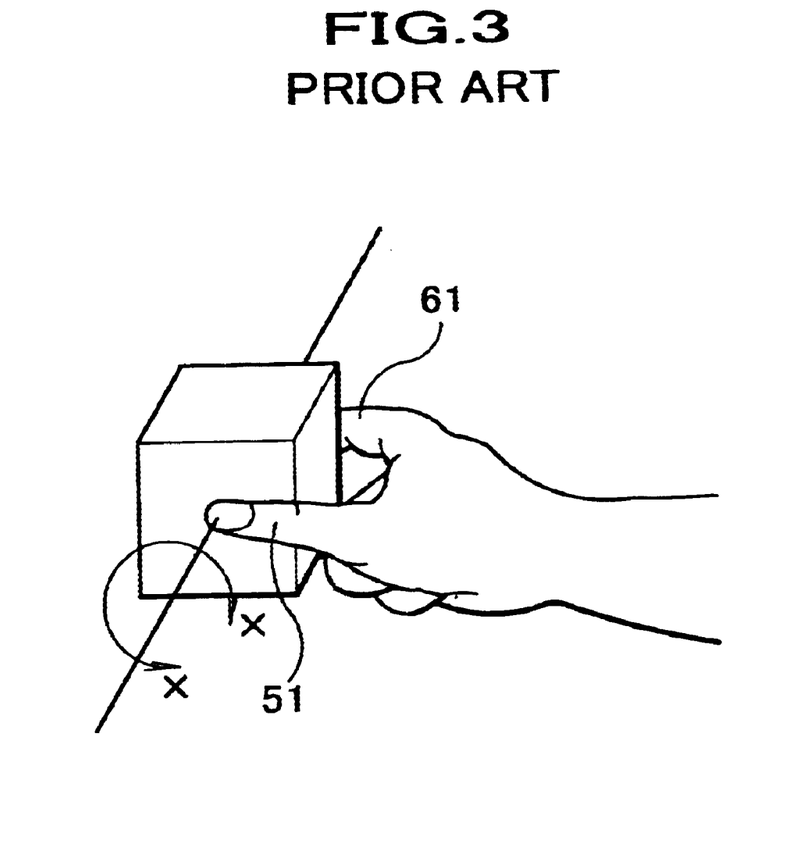
FIG. 3 is a perspective view showing a main portion of the conventional thee-dimensional input apparatus.

Further, as shown in FIG. 2, if two rings 52 are used and each ring is supported by four strings 57, the operation of holding and lifting a three-dimensional object X existing in a virtual space can be operated. However, as shown in FIG. 3, while the operator holds the object or the virtual object X, the rotation around the axis between a thumb 51 and a point finger 61 cannot be performed.

Therefore, in order to solve the above problems, it is an object of the present invention to provide a three-dimensional input apparatus which performs the operations with six degrees of freedom.

A three-dimensional input apparatus according to the present invention comprises an instructing means for instructing three-dimensional position, supporting points provided at least seven locations surrounding the instructing means, for supporting the instructing means so as to be freely moved in the three-dimensional directions and freely rotated around an arbitrary axis, a string connected to each of the supporting points and the instructing means at an end, a measuring means for measuring the length of the string from each of the supporting points to the connected point with the instructing means, and a string tension controlling means for controlling the tension of the string on the basis of the measured result of the measuring means.

Accordingly, when at least seven supporting points and at least seven strings are used, the apparatus can cope with the six degrees of freedom that is the position of three-dimensional position (three degrees of freedom) and the posture (three degrees of freedom).

The measuring means measures the length of the strings from each of the supporting points to the connected point with the instructing means corresponding to the instruction of the instructing means, The string tension controlling means. controls the tension on the basis of the measured result of the measuring means.

Therefore, the tactile sense corresponding to the instruction that is the force feedback is provided to the operator, and owing to the feedback, the operator feels the operation from the change of the force.

In this case, assuming that the string is stable in the initial condition when the same tension acts on the string and that the force vector acting on the instructing means with the string is $qi(\epsilon R6)$ ($i=1$–$8$), it is preferable to put the string so that the rank of the matrix ($\epsilon R6X8$) formed with the eight vectors $qi$ ($i=1$–$8$) is six. Further, the string is preferably made of lightweight member having lower elasticity, e.g., Kevlar (trade name) and fishing line.

According to another aspect of the present invention, a three-dimensional input apparatus comprises an instructing means for instructing the three-dimensional position, constructed to obtain an input by grasping, supporting points provided at least eight locations surrounding the instructing means, for supporting the instructing means so as to be freely moved in the three-dimensional directions and freely rotated around an arbitrary axis, a string connected to each of the supporting points and the instructing means at an end, a measuring means for measuring the length of the string from the supporting point to the connected point with the instructing means, and a string tension controlling means for controlling the tension of the string on the basis of the measured result of the measuring means.

Accordingly, when at least eight supporting points and at least eight strings are used, the apparatus can cope with seven degrees of freedom that is the position of three-dimensional position (three degrees of freedom), the posture (three degrees of freedom) and the grasping (one degree of freedom).

The measuring means measures the length of the strings from each of the supporting points to the connected point with the instructing means corresponding to the instruction of the instructing means. The string tension controlling means controls the tension on the basis of the measured result of the measuring means.

Therefore, the tactile sense corresponding to the instruction that is the force feedback is provided to the operator, and owing to the feedback, the operator feels the operation from the change of the force.

In this case, assuming that the string is stable in the initial condition when the same tension acts on the string and that the force vector acting on the instructing means with the string is $qi(\epsilon R7)$ ($i=1$–$8$), it is preferable to put the string so that the rank of the matrix ($\epsilon R7X8$) formed with the eight vectors $qi$ ($i=1$–$8$) is seven. Further, the string is preferably made of lightweight member having lower elasticity, e.g., Kevlar (trade name) and fishing line.

Here, the instructing means is formed spherical so as to be held by hand and freely expanded and contracted due to the grasping force.

Accordingly, the grasping force can easily be input with at least two fingers. In the case, it is preferable that the instructing means is formed spherical or the like so as to be easily held by hand.

Further, the instructing means may comprise a pair of links crossed to the other and a pin penetrating the center of the links to admit the relative rotation of the links, and a pair of the strings adjacent to the other are connected to both ends of the links.

Accordingly, the grasping force can easily be calculated and the length of the string can be calculated by the four basic operations arithmetic, which improves the speed of calculation and the speed of response.

The first aspect and second aspect of the three-dimensional input apparatus may further comprise a storing means for storing the information of a virtual object which can be recognized by an operator, and a virtual object displaying means for displaying the virtual object in an area where the operator can operate by his hand. The string tension controlling means controls the tension of the string on the basis of measured result of the measuring means and the information of the virtual object loaded from the storing means.

Accordingly, the operator can operate with the same force as the real object while recognizing the virtual object. The operator can experience the realistic operation.

The first aspect and second aspect of the three-dimensional input apparatus may further comprise an operating means for operating an object to be operated, detecting means provided at the operating means, for detecting the contact with the object and an image taking means for taking an image of the object. The string tension controlling means controls the tension of the string on the basis of the measured result of the measuring means and the detected result of the detecting means.

Accordingly, the operator can operate while feeling the tactile sense and while recognizing the object to be operated, which improves the safety and the reliability of the operation.

In the first aspect and second aspect of the three-dimensional input apparatus, each of the supporting points is provided in a shape of a cubic lattice surrounding the instructing means. Accordingly, the force display that is uniform and stable in any directions can be achieved.

PREFERRED EMBODIMENTS OF THE INVENTION

The preferred embodiment of the present invention will be described with reference to the accompany drawings.
(First Embodiment)

Figure 4:
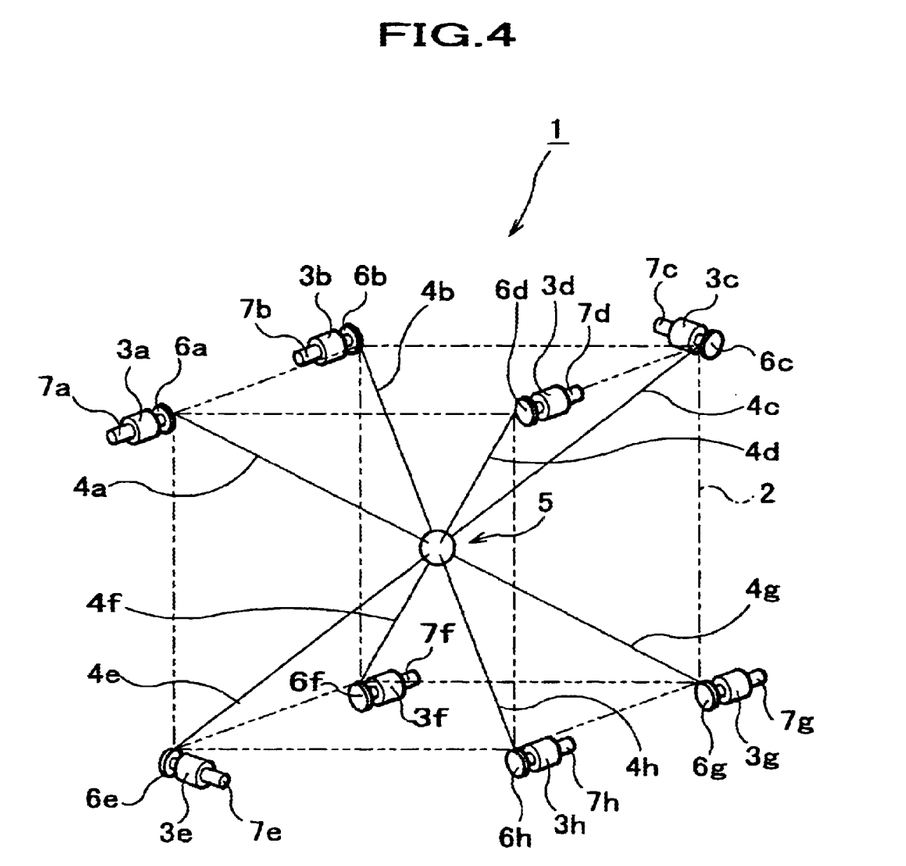
FIG. 4 is a perspective view showing a three-dimensional input apparatus according to the first embodiment of the present invention.

FIG. 4 shows a three-dimensional input apparatus 1 according to the first embodiment of the present invention. There are eight motors (DC motors) $3a, 3b, 3c, 3d, 3e, 3f, 3g, 3h$ each placed at each corner of a frame 2.

The frame 2 is formed in a cubic lattice to give a uniform and stable force in any directions. The frame 2 supports one grip 5 with eight strings $4a, 4b, 4c, 4d, 4e, 4g, 4h$ at the center.

The grip 5 is formed spherical so as to be held by the thumb and other finger. One ends of the eight strings $4a, 4b, 4c, 4d, 4e, 4f, 4g, 4h$ are connected to the upper and lower portions of the right half of the grip 5 and the upper and lower portions of the left half of the grip 5 so as to be a bilateral symmetry. The other ends of the strings $4a, 4b, 4c, 4d, 4e, 4f, 4g, 4h$ wind around pulleys $6a, 6b, 6c, 6d, 6e, 6f, 6g, 6h$ rotating together with motor shafts of the motors $3a, 3b, 3c, 3d, 3e, 3f, 3g, 3h$, respectively.

There are rotary encoders $7a, 7b, 7c, 7d, 7e, 7f, 7g, 7h$ which constitute a part of a string length measuring means attached to the motors $3a, 3b, 3c, 3d, 3e, 3f, 3g, 3h$, respectively. The length of the strings $4a, 4b, 4c, 4d, 4e, 4f, 4g, 4h$ from the pulleys $6a, 6b, 6c, 6d, 6e, 6f, 6g, 6h$ where the strings are in contact (hereinafter called supporting points) to the grip 5 where the strings are connected is measured by adding the number of pulse output from the rotary encoders $7a, 7b, 7c, 7d, 7e, 7f, 7g, 7h$.

It should be noted that the strings $4a, 4b, 4c, 4d, 4e, 4f, 4g, 4h$ are made of a lightweight material which is hardly expanded such as fishing line, aromatic polyamide fiber (Kevlar: trade name) and others in order to avoid the influence of inertia and expansion of the strings. The grip 5 is also made of a lightweight material such as aluminum, aluminum alloy, resin and others in order to avoid the influence of inertia.

Accordingly, when the grip 5 which is an instructing means is moved in the three-dimensional directions and rotated around the arbitrary axis while being held by the thumb and other finger, the amount of change in the length of the strings $4a, 4b, 4c, 4d, 4e, 4f, 4g, 4h$ is measured. Then, the position of the grip 5 in the three-dimensional space and the rotation of the grip 5 around the arbitrary axis are detected. Here, the eight strings are used but if there are at least seven strings, the instruction with six degrees of freedom can be performed.

Figure 5:
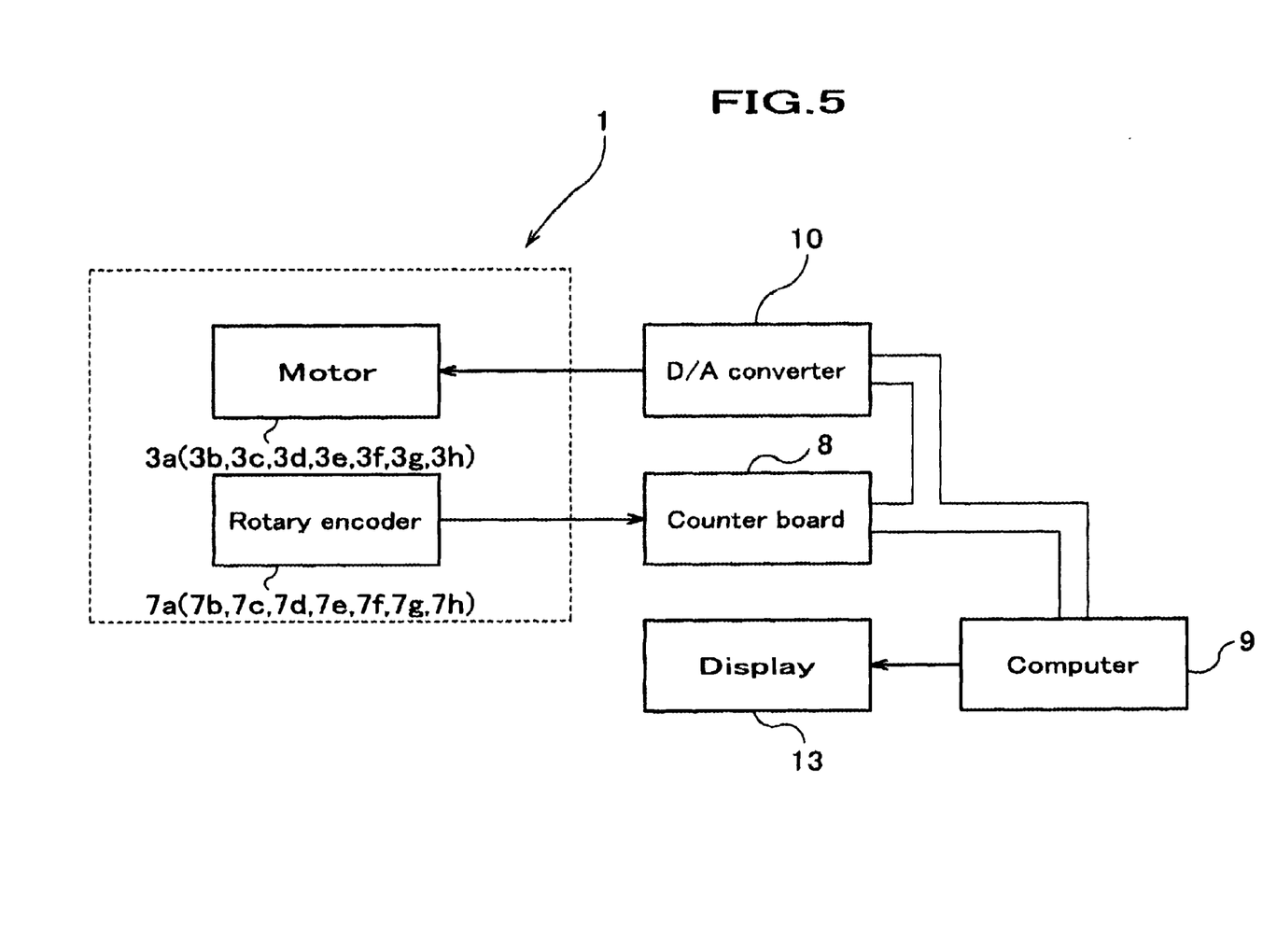
FIG. 5 is a block diagram showing a processing system of the three-dimensional input apparatus of the first embodiment.

FIG. 5 shows one example of an arithmetic processing system of the three-dimensional input apparatus 1.

As shown in FIG. 5, in this system, the outputs of the rotary encoders $7a, 7b, 7c, 7d, 7e, 7f, 7g, 7h$ that are the measuring means are connected to an input of a computer 9 over a counter board 8. Further, the control units of the motors $3a, 3b, 3c, 3d, 3e, 3f, 3g, 3h$ are connected to the computer 9 over a D/A converter 10. When the computer 9 inputs the pulse outputs from the rotary encoders $7a, 7b, 7c, 7d, 7e, 7f, 7g, 7h$ over the counter board 8, an arithmetic processing unit of the computer 9 converts the accumulated pulse into the length of the strings 4a, 4b, 4c, 4e, 4f, 4g, 4h. Then, it calculates the amount of rotation around the arbitrary axis and the three-dimensional position of the grip 5 on the basis of the amount of change in the length of the strings 4a, 4b, 4c, 4d, 4e, 4f, 4g, 4h.

Further, the computer 9 calculates the tension to be applied to the strings 4a, 4b, 4c, 4d, 4e, 4f, 4g, 4h on the basis of the three-dimensional position and posture of the grip 5 and the stored data in the storage of the computer 9, and calculates the rotating direction and the amount of control to be applied to the motors 3a, 3b, 3c, 3d, 3e, 3f, 3g, 3h corresponding to the calculated tension. Then, it outputs the rotating direction and the amount of control to the motors 3a, 3b, 3c, 3d, 3e, 3f, 3g, 3h to feed back the drag to the operator. Accordingly, the operator feels the tactile sense corresponding to the operation.

For example, in the present embodiment, the counter board 8 multiplies the signal pulse output of the rotary encoders 7a, 7b, 7e, 7d, 7e, 7f, 7g, 7h by four to set the accuracy of the measurement of the rotating angle to 2000 counts/rotation and applies the multiplied signal to the computer 9. Further, the radius of the pulleys 6a, 6b, 6c, 6d, 6e, 6f, 6g, 6h for winding the strings 4a, 4b, 4c, 4d, 4e, 4f, 4g, 4h is set to 8 mm, and let the total pulse per rotation be p and the radius of the pulleys 6a, 6b, 6c, 6d, 6e, 6f, 6g, 6h be r. The change D in the length of the string per count is shown by $$D=2\pi r/p=2\pi\times 8/(500\times 4)=0.0251.$$

Accordingly, the amount of change in the length of the string can be measured with the accuracy of 0.0251 mm.

To generate the drag corresponding to the change of the tension of the strings 4a, 4b, 4c, 4d, 4e, 4f, 4g, 4h, because the torque of the motors 3a, 3b, 3c, 3d, 3e, 3f, 3g, 3h is proportional to the current, the tension is controlled by controlling the current supplied to the D/A converter 10 from the computer 9.

Figure 6:
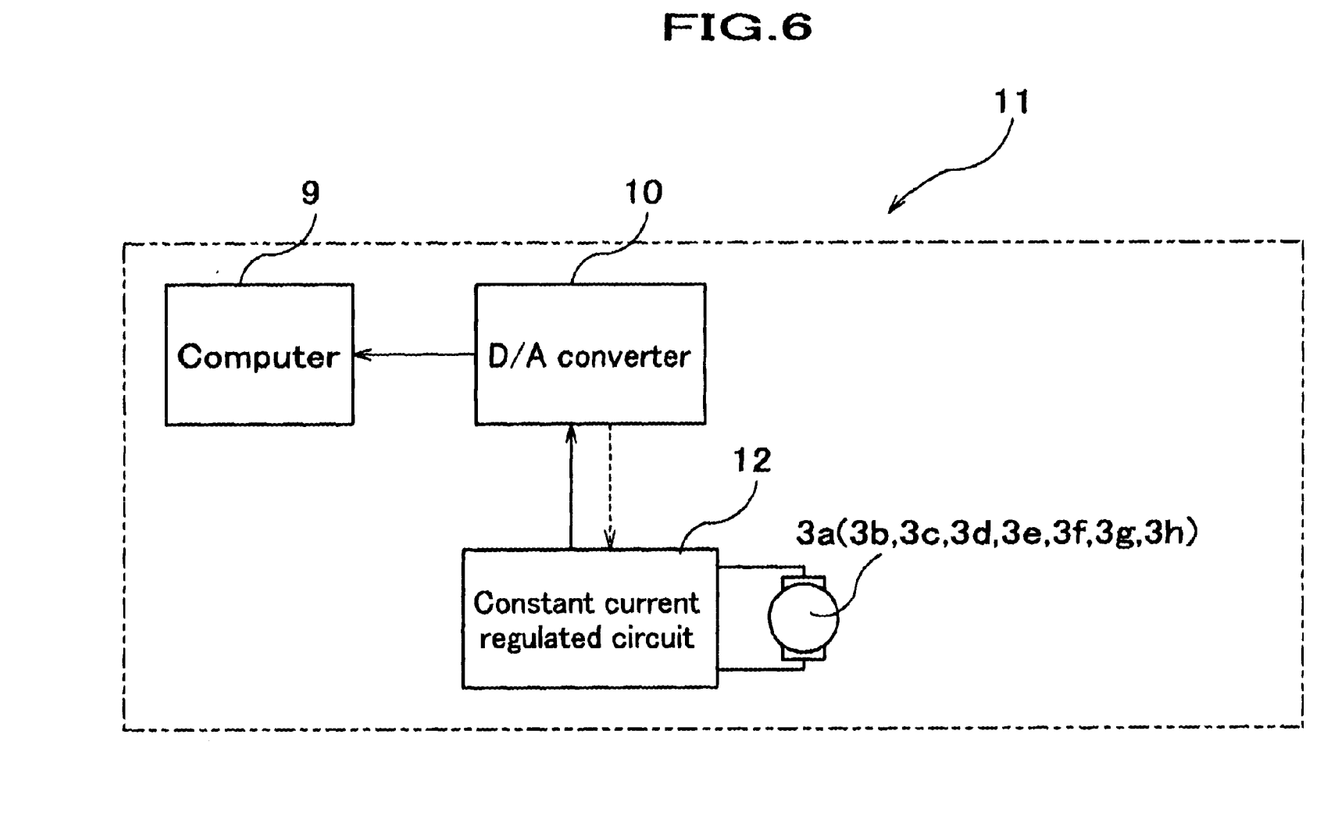
FIG. 6 is a block diagram showing a motor controlling unit of the three-dimensional input apparatus of the first embodiment.

The output of the D/A converter 10, as shown in FIG. 6, is applied to a constant-current regulated circuit 12 using op-amps (not shown) to drive the motors 3a, 3b, 3c, 3d, 3e, 3f, 3g, 3h. Then, the torque of the motors 3a, 3b, 3c, 3d, 3e, 3f, 3g, 3h is controlled and the instructed torque can stably be obtained. Further, a 12-bit D/A converter is used as the D/A converter 10. Then, the tension can be controlled in 4096 stages, and the maximum tension of the motors 3a, 3b, 3c, 3d, 3e, 3f, 3g, 3h is set to 13 mN.

Accordingly, in a case of the above-described operation of the grip 5, six degrees of freedom of the grip 5: the three-dimensional position (three degrees of freedom) and posture (three degrees of freedom) is accurately detected, and the corresponding drag is provided to the operator as the tactile sense.

In the above-described structure, the instruction by the operator holding the grip cannot be input. In order to input such instruction, one of a grip 30 shown in FIG. 7, a grip 31 shown in FIG. 8 and a grip 71 shown in FIG. 9 can be used.

Figure 7:
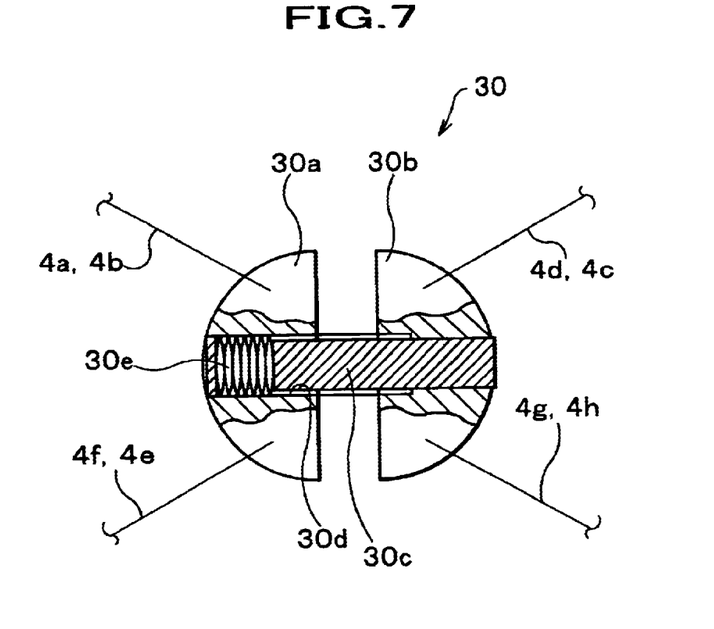
FIG. 7 is a sectional view showing a grip of the three-dimensional input apparatus of the first embodiment.

The grip 30 shown in FIG. 7 comprises a pair of grip divided bodies 30a, 30b which are hemispherical. One grip divided body 30b has a sliding shaft 30c protruding from a divided face at the central portion. The other grip divided body 30a has an insertion hole 30d to which the sliding shaft 30c is inserted so as to freely slide at a divided face. There is an elastic member such as a coil spring 30e or a rubber in the insertion hole 30d to apply the elasticity to the end face of the sliding shaft 30c and the bottom of the insertion hole 30d.

Further, the eight strings 4d, 4c, 4g, 4h, 4a, 4b, 4f, 4e are attached to the upper and lower portions of the grip divided body 30b and the upper and lower portions of the grip divided body 30a so as to be symmetric. The strings 4a, 4b, 4c, 4d, 4e, 4f, 4g, 4h wind around the pulleys 6a, 6b, 6c, 6d, 6e, 6f, 6g, 6h of the motors 3a, 3b, 3c, 3d, 3e, 3f, 3g, 3h, respectively.

Accordingly, when the pair of the grip dividing bodies 30a, 30b are held along the axis of the sliding shaft 30c, the length of the strings 4a, 4b, 4c, 4d, 4e, 4f, 4g, 4h from the supporting point to the connecting points of the grip 5 is changed. Of course when the grip 30 is moved in the three-dimensional directions and the grip 30 is rotated around the arbitrary rotating shaft, the length of the strings is also changed.

In this case, the pair of the grip divided bodies 30a, 30b are made of aluminum, aluminum alloy, resin member having small specific gravity, wood, synthetic wood or others. Further, the sliding shaft 30c and the insertion hole 30d have a cross section such as a rectangular section for preventing the rotation, and a pin, a hook or others for preventing the sliding shaft 30c from falling out from the insertion hole 30d.

Figure 8:
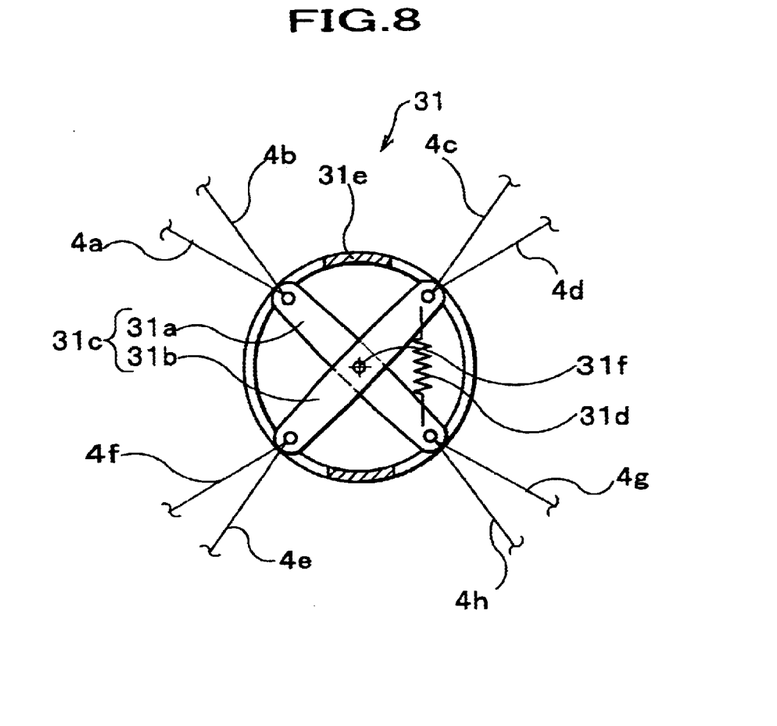
FIG. 8 is a sectional view showing another grip of the three-dimensional input apparatus of the first embodiment.

Next, the grip 31 shown in FIG. 8 comprises a folding link 31c having a pair of link plates 31a, 31b crossed to the other and a connecting pin (a rivet) 31f penetrating the central portions of the link plates 31a, 31b, a return spring 31d as an elastic member provided across the link plates 31a, 31b and a spherical surrounding 31e for containing the folding link 31c linked with the return spring 31d. Further, the adjacent two strings 4a and 4b, 4g and 4h, 4c and 4d and 4e and 4f are connected to both ends of the link plates 31a, 31b, respectively.

The strings 4a, 4b, 4c, 4d, 4e, 4f, 4g, 4h are connected to the grip 31 symmetric with a horizontal axis and a vertical axis. The surrounding 31e is made of synthetic rubber having elasticity against the grasping force.

Accordingly, when the surrounding 31d having the elasticity is grasped with the thumb and other finger and the grasping power is increased, the link plates 31a, 31b are rotated from the state that the link plates 31a, 31b are opened with the elasticity of the return spring 31e to the state that the cross angle between the link plates 31a, 31b is made smaller.

Then, the length of the strings 4a, 4b, 4c, 4d, 4e, 4g, 4h from the supporting point to the connected point of the grip 31 is changed according to the change of the grasping power which means the change of the crossing angle between the link plates 31a, 31b. Further, when the change of the length of the strings 4a, 4b, 4c, 4d, 4e, 4g, 4h is detected by the rotary encoders 7a, 7b, 7c, 7d, 7e, 7f, 7g, 7h constituting the part of the length measuring means, the strings 4a, 4b, 4c, 4d, 4e, 4g, 4h are set to have the corresponding tension by driving and controlling the motors 3a, 3b, 3c, 3d, 3e, 3f, 3g, 3h with the computer 9.

Therefore, using the grip 31, seven degrees of freedom of the grip 31: the three-dimensional position (three degrees of freedom), the rotation around the arbitrary axis (three degrees of freedom) and the grasping (one degree of freedom) is accurately detected, and the corresponding drag is provided to the operator as the tactile sense.

Further, when the pair of two strings are connected to both ends of the link plates 31a, 31b, the length can be calculated by the simple four basic operations of arithmetic, which makes the response speed of the processing system faster compared with the use of the grip 5.

Figure 9:
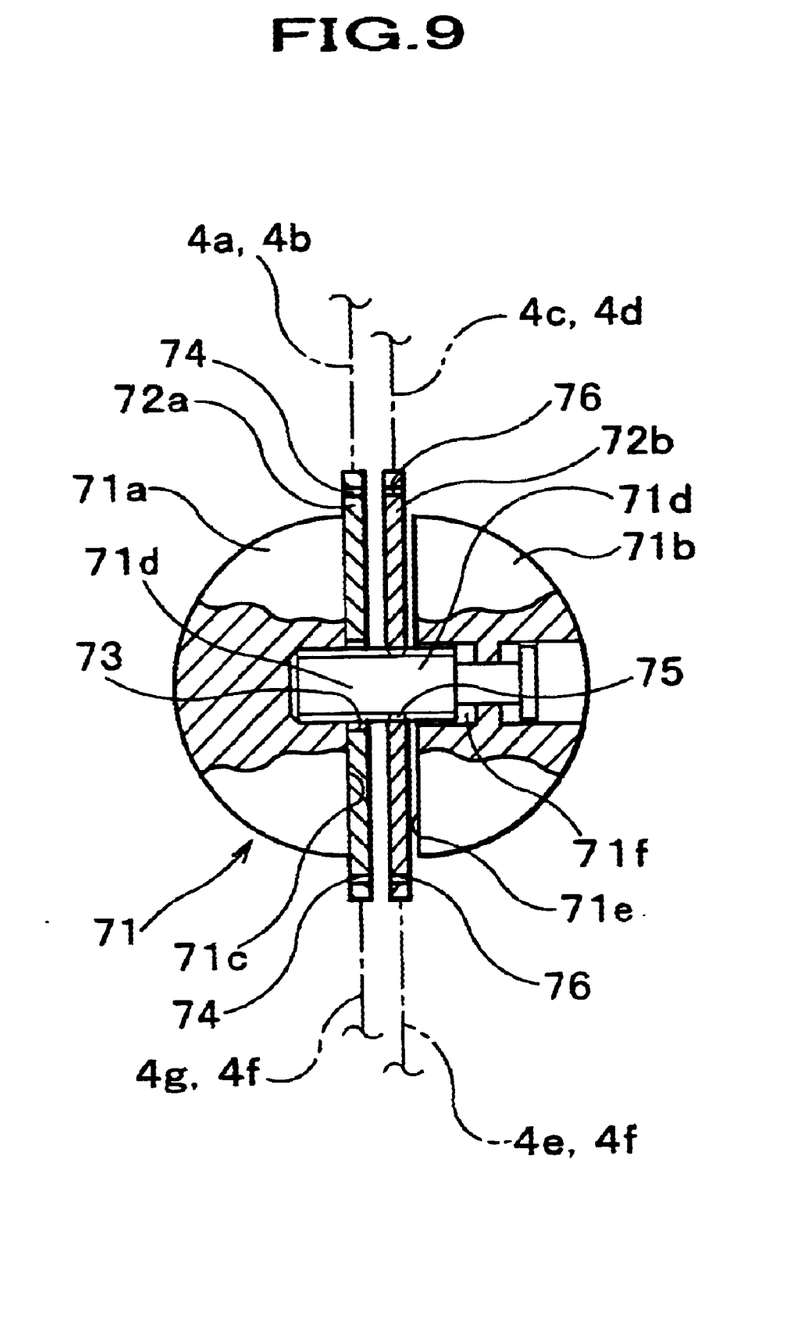
FIG. 9 is a sectional view showing another grip of the three-dimensional input apparatus of the first embodiment.

Next, the grip 71 shown in FIG. 9 comprises a pair of hemispherical grip divided bodies 71a, 71b, a screw shaft 71d extending from the center of a divided face 71c of the grip divided body 71a towards the other divided face 71e of the grip divided body 71b, a shaft guide 71f formed at the central portion of the divided face 71e of the grip divided body 71b and a pair of link plates 72a, 72b.

The link plate 72a has a fitting hole 73 to fit on the screw shaft 71d at the central portion in the lengthwise direction and openings 74 for connecting the strings at both ends. The link plate 72a is fixed to the divided face 71c of the grip divided body 71a after the fitting hole 73 fits on the screw shaft 71d. The link plate 72b has a screw hole 75 to which the screw shaft 71d is screwed and openings 76 for connecting the strings at both ends. The angle of the lead of the screw shaft 71d and the screw hole 75 of the link plate 72 is made smaller than 45°.

As the grip 71 is held and grasped, the grip divided body 71b is moved towards the grip divided body 71a and comes in contact with the link plate 72b. When the link plate 72b is further pressed, it is rotated around the axis of the screw shaft 71d. Accordingly, when the grip 71 is held while the strings 4a, 4b are connected to one hole 74 of the link plate 72a, the strings 4f, 4g to the other hole 74, the strings 4c, 4d to one hole 76 of the link plate 72b and the strings 4e, 4f to the other hole 76, the link plate 72b is rotated and the pulling length of the strings 4c, 4d, 4e, 4f is changed. Therefore, in the same way as the grip 30 shown in FIG. 7, the output of the grasping power can be achieved, and the seven degrees of freedom can be operated. In this case, the three-dimensional position and posture of the grip 71 can accurately be obtained by the subtraction of the change of the tension due to the grasping.

Figure 10:
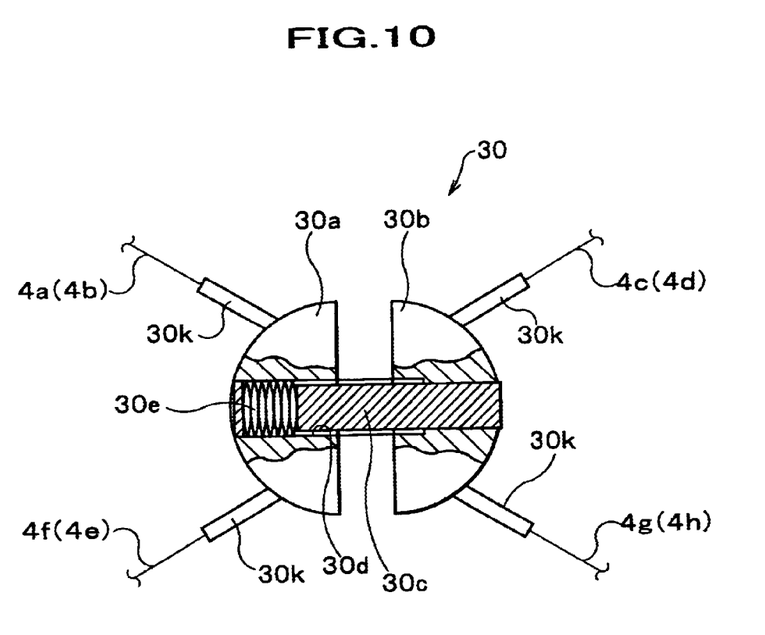
FIG. 10 is a sectional view showing another grip of the three-dimensional input apparatus of the first embodiment.

Further, as shown in FIG. 10, the grip 30 may be provided with protrusions 30k extending towards each corner of the frame 2 at the upper and lower portions of the right half and the upper and lower portions of the left half. In this case, the pair of strings 4a, 4b, 4c, 4d, 4e, 4f, 4g, 4h are connected to the protrusions 30k so as to be symmetric. Thus constructed grip 30 can avoid the interference of the hand, which improves the operation ability.

In this embodiment, the motors 3a, 3b, 3c, 3d, 3e, 3f, 3, 3h, the computer 9 and the D/A converter 10 constitute the string tension controlling means. The rotary encoders 7a, 7b, 7c, 7d, 7e, 7f, 7g, 7h and the computer 9 constitute the string length measuring means.

(Second Embodiment)

Next, referring to FIGS. 11, 12, a three-dimensional input apparatus employed in the three-dimensional operating system for operating a virtual object will be explained.

Figure 11:
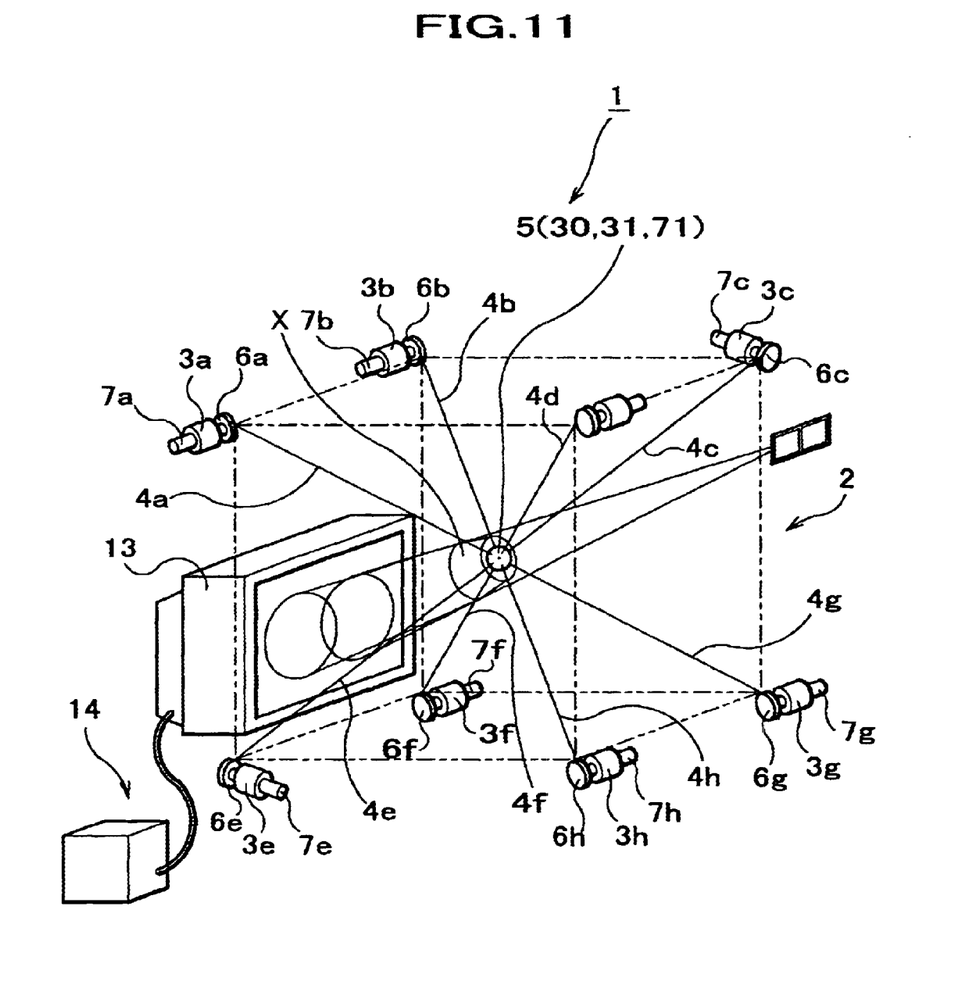
FIG. 11 is a perspective view showing a system for operating a virtual object with the three-dimensional input apparatus.
Figure 12:
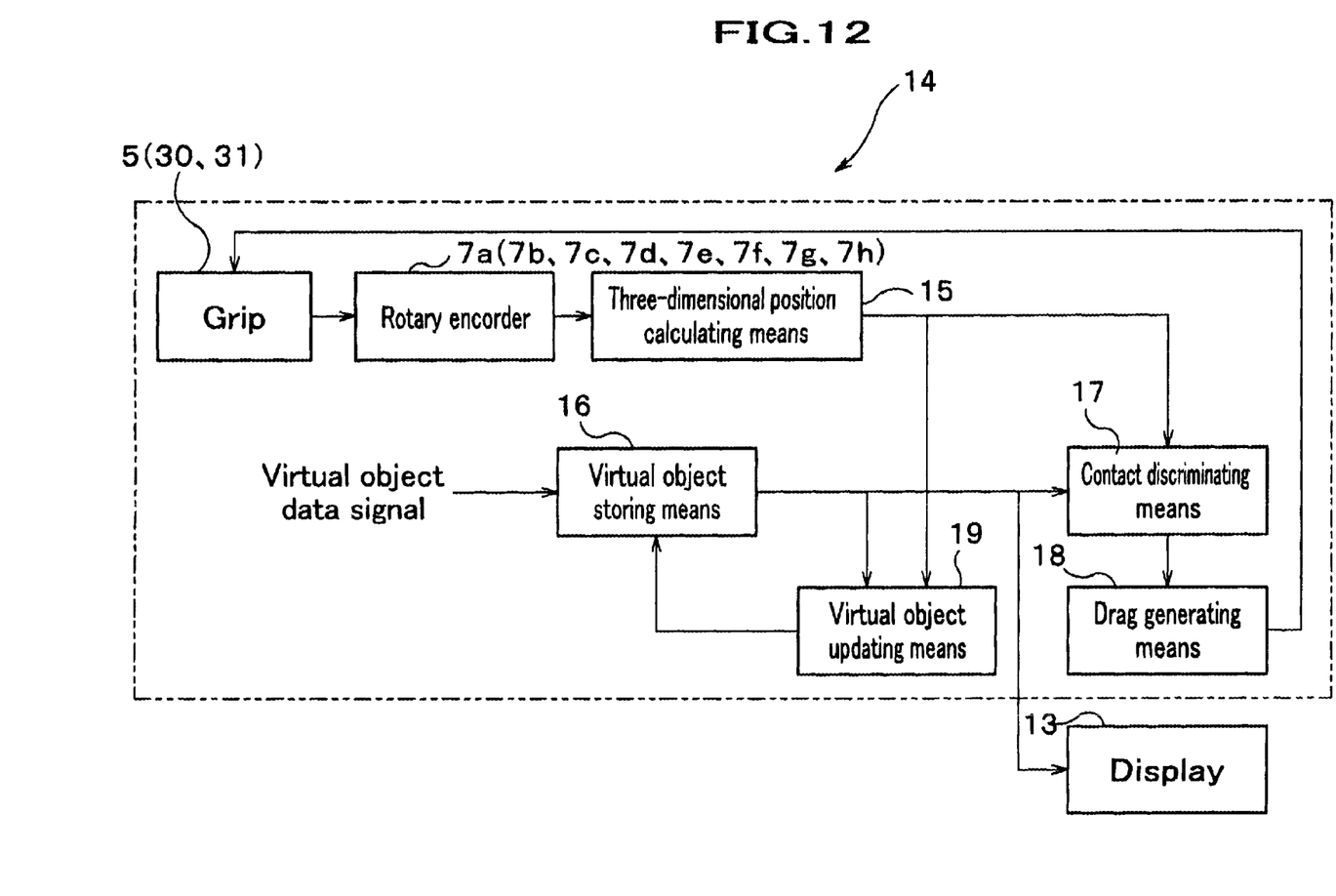
FIG. 12 is a block diagram showing the structure of the processing device.

In FIGS. 11, 12, reference numeral 1 denotes a three-dimensional input apparatus using one of the aforesaid grip 5, grip 30, grip 31 and grip 71; reference numeral 13 denotes a display for displaying the virtual object in front of the operator; and reference numeral 14 denotes a processing device for outputting and displaying the display data of the virtual object X on the display 13. In the present embodiment, the grip 31 is used.

The processing device 14 comprises a three-dimensional position calculating means 15, a virtual object storing means 16, a contact discriminating means 17, a drag generating means 18 and a virtual object updating means 19. The three-dimensional position calculating means 15 adds the pulse outputs from the rotary encoders 7a, 7b, 7c, 7d, 7e, 7f, 7g, 7h and are electrically constructed to calculate the three-dimensional position of the grip 31, the rotation around the arbitrary shaft, and the grasping force and others on the basis of the number of the accumulated pulses. Further, the virtual object storing means 16 stores the information of the virtual object X existing virtually in the three-dimensional space as the data of the virtual object X and the information of the virtual object updated by the virtual object updating means 19.

The contact discriminating means 17 decides whether the instruction point by the grip 31 against the virtual object X, which is calculated by the three-dimensional position calculating means is virtually in contact with the virtual object X on the basis of the information of the virtual object X stored in the virtual object storing means 16, that is, whether the instruction point exists inside the virtual object X or outside the virtual object X. The following equation (1) is used for discrimination.

$$f(x, y, z)=0 \text{ (inside)}, 1 \text{ (boundary)}, 2 \text{ (outside)} \quad (1)$$

Here, (x, y, z) is the coordinates of the arbitrary point.

When f(x, y, z)=0 (inside) or 1 (boundary), it is decided that the position of the instruction point by the grip 31 is in contact with the virtual object X.

Further, when the drag generating means 18 decides that the instruction point of the grip 31 is in contact with the virtual object X on the basis of the contact discriminating signal from the contact discriminating means 17, it controls the corresponding motors 3a–3h as the feedback. Then, owing to the control of the motors, it controls the change of the length of the strings 4a, 4b, 4c, 4d, 4e, 4f, 4g, 4h or increases or decreases the tension of the strings. In result, the drag corresponding to the contact with the virtual object X is provided to the operator's fingers operating the grip 31.

The virtual object updating means 19 inputs the position of the instruction point of the grip 31 calculated by the three-dimensional calculating means 15 and the data of the virtual object X stored in the virtual object storing means 16. When the instruction point of the grip 31 is inside the virtual object X, the virtual object updating means 19 updates the information of the virtual object X such as the transformation, movement, the change of posture and others and outputs the updated information to the virtual object storing means 16. Accordingly, the operation with seven degrees of freedom that the human performs against the virtual object X is reflected to the virtual object X on the display 13.

In the present embodiment, a well-known computer including a memory, a CPU, an I/O, an interruption circuit and a data read/write device can constitute the above-described processing device 14. Further, in order to achieve the three-dimensional effect, the position of the frame 2 is previously determined as if the grip 31, 30 or 71 and the virtual object X are connected together when the three-dimensional glass is used.

The position of the grip 31, 30 or 71 does not have to physically match the virtual object. The grip 31, 30 or 71 can be placed close at hand to operate like a mouse used to operate a computer.

(Third Embodiment)

Next, referring to FIG. 13, a three-dimensional input apparatus employed in a remote control system according to the third embodiment of the present invention will be described. In the third embodiment, the grip 31 is used; however, the grip 30 and the grip 71 can be used instead.

Figure 13:
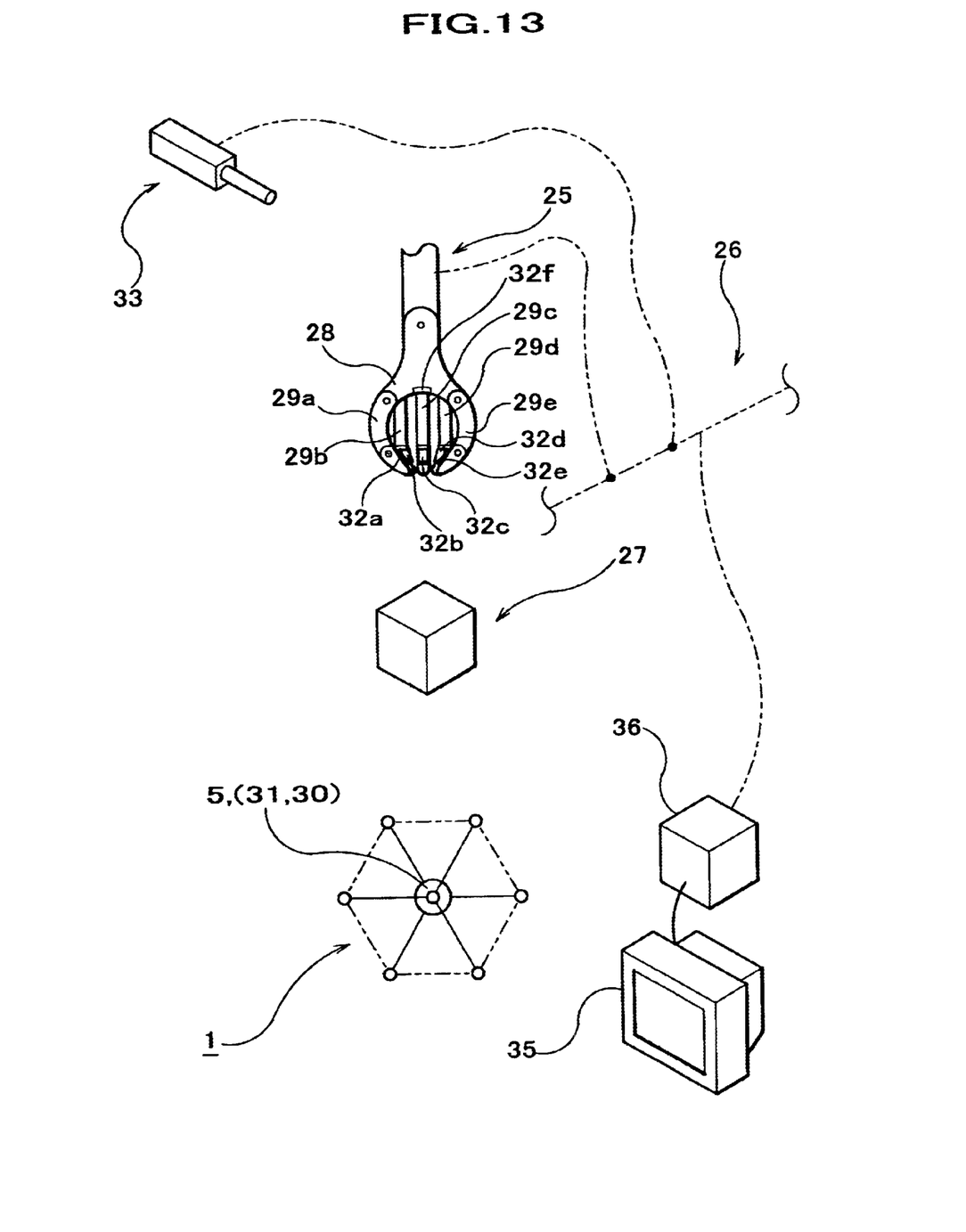
FIG. 13 is a view showing a system for remote operating the object with the thee-dimensional input apparatus.

In FIG. 13, reference numeral 25 denotes a well-known robot arm; reference numeral 26 denotes a communication line and reference numeral 27 denotes an object to be operated. The robot arm 25 and the object 27 to be operated are provided at a distant place and the three-dimensional input apparatus 1 is provided at the location of the operator.

The robot arm 25 that is an arm portion of an operating means such as a manipulator comprises a holding unit 28 having five fingers 29a, 29b, 29c, 29d, 29e for holding the object 27 to be operated.

Detecting means 32a, 32b, 32c, 32d, 32e for detecting the contact with the object 27 to be operated and the force of contact, for example, a pressure detecting means, a deformation detecting means and other well-know detecting means are provided at the object holding faces of the fingers 29a, 29b, 29c, 29d, 29e. The detecting means output a signal corresponding holdings and a signal proportional to the increase and decrease of the grasping force. Further, there is an image taking means 33, e.g., a monitoring camera and a monitoring video camera provided at the structure, e.g., a cell, wall, pillar and beam at the distant place. A drive controlling unit (not shown) for the image taking means 33 and the detecting means 32a, 32b, 32c, 32d, 32e and the robot arm 25 is connected to the computer 36 at the location of the operator through the communication line 26 such as telephone line and the private line. The computer 36 is connected to the three-dimensional input apparatus 1, the object 27 to be operated and the display 35 for displaying the robot arm 25.

In order to grasp and move the object 27 to be operated by the robot arm 25, first, the operator remote controls to set the range of image taking area to the monitoring position. Next, the operator operates the three-dimensional input apparatus 1 to hold and move the object 27 to be operated.

Then, when the operator starts operating the three-dimensional input apparatus 1, the computer 3 monitors the instruction position of the grip 31 on the basis of the number of accumulated pulse input from the rotary encoders 7a, 7b, 7c, 7d, 7e, 7f, 7g, 7h and switches the vertical movement and horizontal movement of the robot arm 25. Accordingly, when the operator moves the grip 31 left and right while watching, the robot arm 26 is driven in the corresponding direction and the tactile sense calculated corresponding to the movement of the robot arm 25 is provided to the operator.

Further, when the operator recognizes that the holding unit 28 is positioned above the object 27 to be operated and that the holding unit 28 is faced to the object 27 to be operated while watching, the operator lowers the grip 31 slowly. Then, the computer 36 senses that the holding unit 28 reaches the object 27 by the detecting means 32f provided at the palm of the holding unit 28, and then controls the rotating direction and the amount of rotation of the motors 3a, 3b, 3c, 3d, 3e, 3f, 3g, 3h and provides the tactile sense to the operator.

When the operator senses the holding unit 28 reached the object 27 by the feedback of the tactile sense, the operator starts holding the object 27 by operating the grip 31.

The holding is performed by holding the grip 31 with the thumb and other finger(s) as described above. As the computer 36 detects the change of the length of the strings 4a, 4b, 4c, 4d, 4e, 4f, 4g, 4h on the basis of the pulse outputs from the rotary encoders 7a, 7b, 7c, 7d, 7e, 7f, 7g, 7h, it outputs the corresponding signal to the motors 3a, 3b, 3c, 3d, 3e, 3f, 3g, 3h to start holding.

Thereafter, when the computer 36 inputs the holding signal from the detecting means 32a, 32b, 32c, 32d, 32e provided at the five fingers 29a, 29b, 29c, 29d, 29e of the holding unit 28, it controls the rotating direction and the amount of rotation of the motors 3a, 3b, 3c, 3d, 3e, 3f, 3g, 3h corresponding to the holding of each finger and provides the corresponding drag to the operator.

When the detecting means 32a, 32b, 32c, 32d, 32e outputs the predetermined signal, the computer advises that the holding is completed. It should be noted that when the holding is completed, the large force can be provided to the grip 31 for the operator to recognize the complete of holding. Alternatively, another condition such as vibration can be used to notify the complete of holding.

After the holding is completed, while holding the grip 31 with the fingers, the operator moves the grip 31 upward, moves the grip 31 left and light at the certain height, lifts up the object 27 to be operated at the certain height, moves the grip 31 left or right to move the object 27 horizontally and lowers the grip 31 at the instructed position to mount the object 27 on the instructed location. In this case, a push button may be provided at the grip 31, so that when the signal is continuously supplied from the push button, the holding control is continued.

Further, a push button may be provided for another control. Furthermore, a push button switch or a shift switch may be provided at the grip 31 for distinguishing the operation of the grip 31 that is the movement of the robot arm 25, the elevating motion of the robot arm 25 and the holding motion of the robot arm 25.

Therefore, the object 27 to be operated can be moved safely and accurately while the object 27 is monitored at the distant place.

If the object 27 to be operated can be looked from the window, the image taking means 33 can be omitted.

Thus, as described above, the three-dimensional input apparatus 1 according to the present embodiments of the present invention can be applied to kinds of input apparatus to achieve the natural virtual reality. In order to improve the operation ability, the push button may be provided at the grip as described in the third embodiment.

For example, a hole for containing the button freely come out is formed at the body. In this case, the end of the string is crossed over the hole and the string is pulled by the lower face of the button inserted in the hole, so that the holding can be detected by operating the button. In this structure, the drag is calculated on the basis of the tension of the string corresponding to the operation of the button. Then, when the motor is controlled by the amount of control corresponding to the drag, the corresponding drag is provided to the operator. Accordingly, the operator feels the operation lighter.

Further, the user interface can be improved by providing other buttons and/or one to three shift switches for other controls such as the command input. In this case, a switch operated by the push button or the shift button is provided inside the grip.

Furthermore, the pulse width modulation (PWM) control can be applied for the control of the motors 3a–3h in the above embodiments. In this case, the energy efficiency can be improved. The present invention can be modified in many ways. The various modifications and can be made without departing from the spirit and scope of the invention as defined by the appended claims.

What is claimed is:

1. A three-dimensional input apparatus comprising:
an instructing means for instructing three-dimensional position and posture;
supporting points provided at least seven locations surrounding said instructing means, for supporting said instructing means so as to be freely moved in three-dimensional directions and freely rotated around an arbitrary axis;
a string extending from each of said supporting points and connected to a connected point on said instructing means;
a measuring means for measuring the length of said string from each of said supporting points to the connected point;

a string tension controlling means; and a three-dimensional position calculating means, wherein said three-dimensional position calculating means computes for said instructing means at least one of three-dimensional coordinates and rotational angles about respective axes in a predetermined three-dimensional coordinate system according to the length measured by said measuring means;

wherein said apparatus generates translational force and rotational force through said string tension control means for said instructing means based on the three-dimensional coordinates and rotational angles.

2. A three-dimensional input apparatus according to claim 1 further comprising:

a storing means for storing the information of a virtual object visually recognizable by an operator; and a virtual object displaying means for displaying the virtual object based on the information stored in said storing means, wherein said apparatus generates the translational force and rotational force through said string tension control means for said instructing means based on the information of the virtual object as well as the three-dimensional coordinates and rotational angles.

3. A three-dimensional input apparatus according to claim 1 further comprising:

an operating means for operating an object;

a detecting means provided at said operating means, for detecting if said operating means is in contact with the object; and an image taking means for taking an image of the object, wherein said apparatus generates the translational force and rotational force through said string tension control means for said instructing means based on results of detection performed by the detecting means as well as the three-dimensional coordinates and rotational angles.

4. A three-dimensional input apparatus according to claim 1, wherein each of said supporting points is provided in a shape of a cubic lattice surrounding said instructing means.

5. A three-dimensional input apparatus comprising:

an instructing means for instructing three-dimensional position and posture, said instructing means adapted for instruction of grasping;

supporting points provided at least eight locations surrounding said instructing means, for supporting said instructing means so as to be freely moved in three-dimensional directions and freely rotated around an arbitrary axis and capable of entering an instruction of grasping;

at least eight strings which extend from said supporting points respectively and are connected independently to connected points on said instructing means;

a measuring means for measuring the length of a string from a supporting point to a connected point on said instructing means;

a string tension controlling means; and a three-dimensional position calculating means, wherein said three-dimensional position calculating means computes for said instructing means at least one of three-dimensional coordinates and rotational angles about respective axes in a predetermined three-dimensional coordinate system according to the length measured by said measuring means, and wherein said three-dimensional position calculating means computes deformation of said instructing means based on changes in geometrical relation among the connected points on the said instructing means resulting from the deformation of the instruction means;

wherein said apparatus generates grasping force, translational force and rotational force based on the deformation as well as the three-dimensional coordinates and rotational angles for said instructing means through the string tension control means.

6. A three-dimensional input apparatus according to claim 5, wherein said instructing means is formed approximately spherical so as to be grasped by an operator and said instructing means is adapted to freely expand and contract responsive to force applied by the operator.

7. A three-dimensional input apparatus according to claim 5, said instructing means comprises a pair of links crossing each other and a pin penetrating centers of said links to allow the relative rotation of said links and a pair of said strings adjacent to each other is connected to an end of each link.

8. A three-dimensional input apparatus according to claim 5 further comprising:

a storing means for storing the information of a virtual object visually recognizable by an operator; and a virtual object displaying means for displaying the virtual object based on the information stored in the storing means, wherein said apparatus generates the grasping force, translational force and rotational force based on the information of the virtual object, the deformation as well as the three-dimensional coordinates and rotational angles for said instructing means through the string tension control means.

9. A three-dimensional input apparatus according to claim 5 further comprising:

an operating means for operating an object;

a detecting means provided at said operating means, for detecting if said operating means is in contact with the object; and an image taking means for taking an image of the object, wherein said apparatus generates the grasping force, translational force and rotational force based on results of detection performed by the detecting means, the deformation as well as the three-dimensional coordinates and rotational angles for said instructing means through the string tension control means.

10. A three-dimensional input apparatus according to claim 5, wherein each of said supporting points is provided in a shape of a cubic lattice surrounding said instructing means.

* * * * *